United States Patent
Son et al.

(10) Patent No.: US 11,738,470 B2
(45) Date of Patent: Aug. 29, 2023

(54) TOOL CHANGER AND TOOL CHANGE SYSTEM HAVING THE SAME

(71) Applicant: LG ELECTRONICS INC., Seoul (KR)

(72) Inventors: Changwoo Son, Seoul (KR); Seukwoo Ryu, Seoul (KR); Sunggil Park, Seoul (KR); Seyul Son, Seoul (KR); Taeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 892 days.

(21) Appl. No.: 16/748,348

(22) Filed: Jan. 21, 2020

(65) Prior Publication Data

US 2021/0101295 A1    Apr. 8, 2021

(30) Foreign Application Priority Data

Oct. 2, 2019 (KR) ........................ 10-2019-0122097

(51) Int. Cl.
*B25J 15/06* (2006.01)
*H02K 21/20* (2006.01)
*H02K 5/22* (2006.01)
*B25J 15/04* (2006.01)

(52) U.S. Cl.
CPC ....... *B25J 15/0608* (2013.01); *B25J 15/0441* (2013.01); *H02K 5/225* (2013.01); *H02K 21/20* (2013.01)

(58) Field of Classification Search
CPC ............... B25J 15/0608; B25J 15/0441; B25J 11/0045; H02K 5/225; H02K 21/20
See application file for complete search history.

(56) References Cited

U.S. PATENT DOCUMENTS

2018/0304475 A1* 10/2018 Zachary ............... B25J 15/0416

* cited by examiner

*Primary Examiner* — Jacob M Amick
*Assistant Examiner* — Charles J Brauch
(74) *Attorney, Agent, or Firm* — Birch, Stewart, Kolasch & Birch, LLP

(57) ABSTRACT

A tool changer in accordance with the present disclosure comprises: a housing fastened to a manipulator of a robot, wherein the housing is a non-magnetic material; a bar-shaped magnet disposed in the housing; a motor configured to rotate the magnet on a rotation shaft perpendicular to a longitudinal direction of the magnet; and a core configured to derive a path of a magnetic flux by the magnet. The core comprises: a pair of first poles facing both poles of the magnet, when the magnet rotates to be elongated in a first direction; a bridge configured to connect the pair of the first poles and disposed in the housing, wherein the bridge is a magnetic material; a pair of second poles facing the both poles of the magnet, when the magnet rotates to be elongated in a second direction perpendicular to the first direction; and a pair of terminals connected to the second poles and facing a magnetic body disposed outside the housing.

20 Claims, 13 Drawing Sheets

TOOL CHANGER AND TOOL CHANGE SYSTEM HAVING THE SAME

CROSS-REFERENCE TO RELATED APPLICATIONS

The present application claims priority under 35 U.S.C. 119 and 35 U.S.C. 365 to Korean Patent Application No. 10-2019-0122097 filed on Oct. 2, 2019, which is hereby incorporated by reference in its entirety.

BACKGROUND

The present disclosure relates to a tool changer provided in a manipulator of a robot and a tool change system including the same.

In general, a mechanism that performs exercise looking like a human motion by using an electrical or magnetic action is named a robot. In recent, robots are being utilized in a variety of fields due to development in control technology, and, for example, may include surgical robots, housekeeping robots, service robots, space-air remote robots, dangerous substance treating robots and so forth. Such robots perform tasks by using a manipulator made to exercise close to motions of arms or hands by an electrical/mechanical mechanism.

In particular, housekeeping robots can perform specific tasks by fastening a specific tool to the manipulator. As an example, cooking robots can perform cooking by fastening a variety of tools such as a ladle, tongs, a pot and the like, to the manipulator.

Thus, for improvement of work performance efficiency of the robot, it is important for a tool changer provided in the manipulator to rapidly and exactly change the tool.

However, since conventional tool changers use a pneumatic system, they require a big structure and subsidiary equipment, and thus many expenses are incurred and noises take place.

SUMMARY

One technical problem to be solved by the present disclosure is intended to provide a tool changer which can change a tool compactly, rapidly and conveniently, and a tool change system including the same.

A tool changer according to an embodiment of the present disclosure may comprise: a housing fastened to a manipulator of a robot, wherein the housing is a non-magnetic material; a bar-shaped magnet disposed in the housing; a motor configured to rotate the magnet on a rotation shaft perpendicular to a longitudinal direction of the magnet; and a core configured to derive a path of a magnetic flux by the magnet. The core may comprise: a pair of first poles facing both poles of the magnet, when the magnet rotates to be elongated in a first direction, a bridge configured to connect the pair of the first poles and disposed in the housing, wherein the bridge is a magnetic material; a pair of second poles facing the both poles of the magnet, when the magnet rotates to be elongated in a second direction perpendicular to the first direction; and a pair of terminals connected to the second poles and facing a magnetic body disposed outside the housing.

The pair of first poles and the pair of second poles may be spaced apart from the both poles of the magnet.

Inner surfaces of the pair of first poles and the pair of second poles may be concavely formed, and the both ends of the magnet may be convexly formed.

The pair of first poles and the pair of second poles may be alternately disposed relative to a circumferential direction of an imaginary circle centered on the rotation shaft of the magnet.

The first pole may comprise: a first pole body connected to the bridge; and a first pole shoe protruding from the both sides of the first pole body to the circumferential direction of the imaginary circle. The second pole may comprise: a second pole body connected to the terminal; and a second pole shoe protruding from both sides of the second pole body to the circumferential direction of the imaginary circle.

The pair of first poles and the pair of second poles may be spaced apart from the both poles of the magnet, and the first pole shoe and the second pole shoe may be spaced from each other.

A gap between the first pole shoe and the second pole shoe may be greater than a gap between the pair of first poles or the pair of second poles and the both poles of the magnet.

The first pole shoe and the second pole shoe may be in line contact with each other; and a cross-section area of the first pole shoe may get narrow as the cross-section area may get closer to the second pole shoe, and a cross-section area of the second pole shoe may get narrow as the cross-section area may get closer to the first pole shoe.

A tool change system according to an embodiment of the present disclosure may comprise: a tool coupler having a magnetic body and fastened to a tool; and a tool changer provided in a manipulator of a robot and selectively fastened to the tool coupler. The tool changer may comprise: a bar-shaped magnet; a motor configured to rotate the magnet on a rotation shaft perpendicular to a longitudinal direction of the magnet; and a pair of first poles facing both poles of the magnet, when the magnet rotates at a first angle, a bridge configured to connect the first poles, wherein the bridge is a magnetic material; a pair of second poles facing the both poles of the magnet, when the magnet rotates at a second angle different from the first angle; and a pair of terminals connected to the second poles and facing the magnetic body.

The pair of terminals may be spaced apart from the magnetic body.

The pair of first poles and the pair of second poles may be spaced apart from the both poles of the magnet.

Inner surfaces of the pair of first poles and the pair of second poles may be concavely formed, and the both ends of the magnet may be convexly formed.

The pair of first poles and the pair of second poles may be alternately disposed on an imaginary circle centered on the rotation shaft of the magnet.

The first pole may comprise: a first pole body connected to the bridge; and a first pole shoe protruding from the both sides of the first pole body to the circumferential direction of the imaginary circle. The second pole may comprise: a second pole body connected to the terminal; and a second pole shoe protruding from both sides of the second pole body to the circumferential direction of the imaginary circle.

The pair of first poles and the pair of second poles may be spaced apart from the both poles of the magnet, the pair of terminals may be spaced from the magnet body, and the first pole shoe and the second pole shoe may be spaced apart from each other.

A gap between the first pole shoe and the second pole shoe may be greater than a gap between the pair of first poles or the pair of second poles and the both poles of the magnet.

A gap between the first pole shoe and the second pole shoe may be greater than a gap between the pair of terminals and the magnetic body A gap between the first pole shoe and the second pole shoe may be greater than a sum of a gap between the pair of terminals and the magnetic body and a gap between the pair of first poles or the pair of second poles and the both poles of the magnet.

The first pole shoe and the second pole shoe may be in direct contact with each other, and a cross-section area of the first pole shoe may get narrow as the cross-section area may get closer to the second pole shoe, and a cross-section area of the second pole shoe may get narrow as the cross-section area may get closer to the first pole shoe.

The tool changer further may comprise a housing configured to accommodate the magnet, the motor, the first pole, the bridge and the second pole, and mounted in the manipulator.

DETAILED DESCRIPTION OF THE EMBODIMENTS

Figure 1:
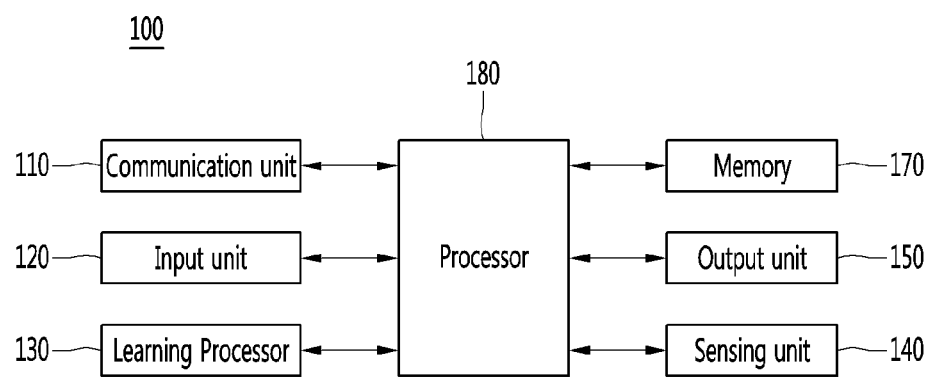
FIG. 1 illustrates an AI device including a robot according to an embodiment of the present disclosure.

Hereinafter, detailed embodiments will be described in detail with reference to the accompanying drawings of the present disclosure.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
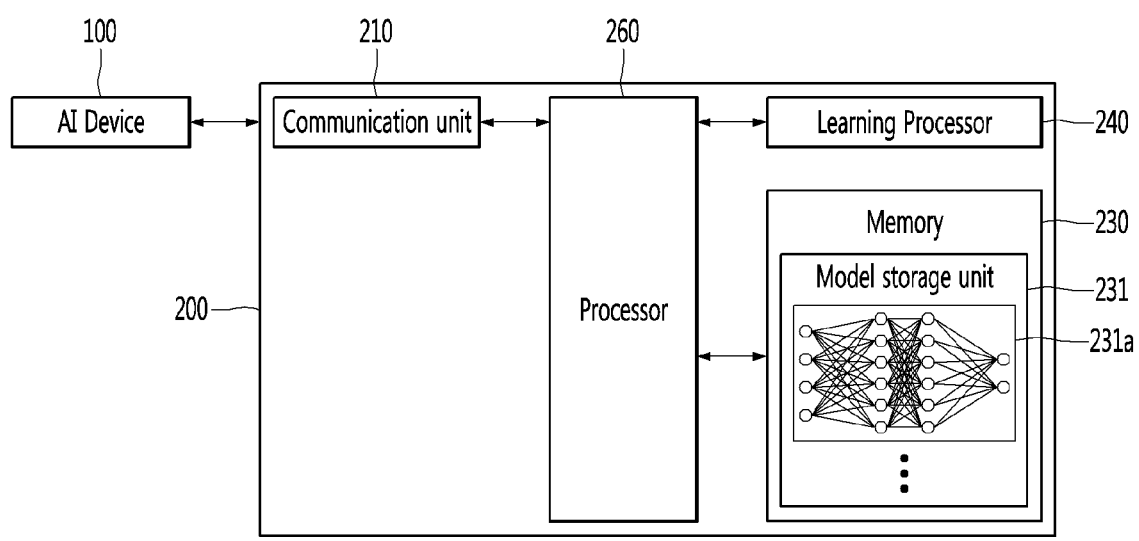
FIG. 2 illustrates an AI server connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
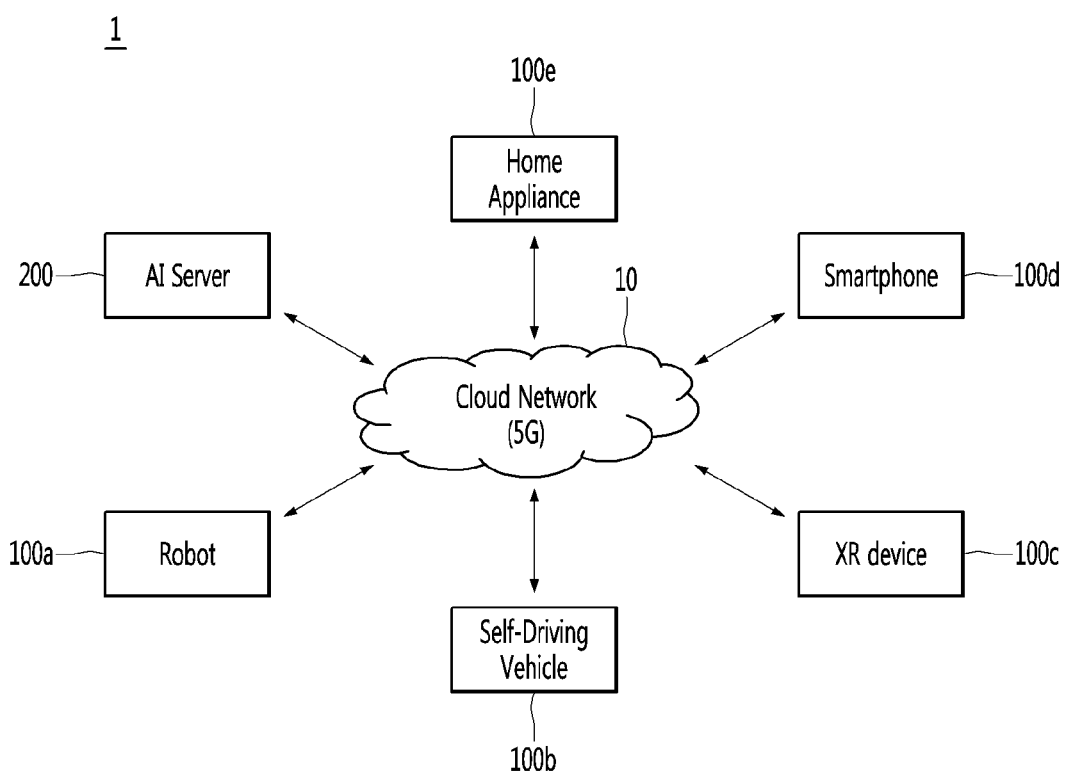
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/ interaction of the user. At this time, the robot 100a may acquire the intention information of the interaction due to the user's operation or speech utterance, and may determine the response based on the acquired intention information, and may perform the operation.

Figure 4:
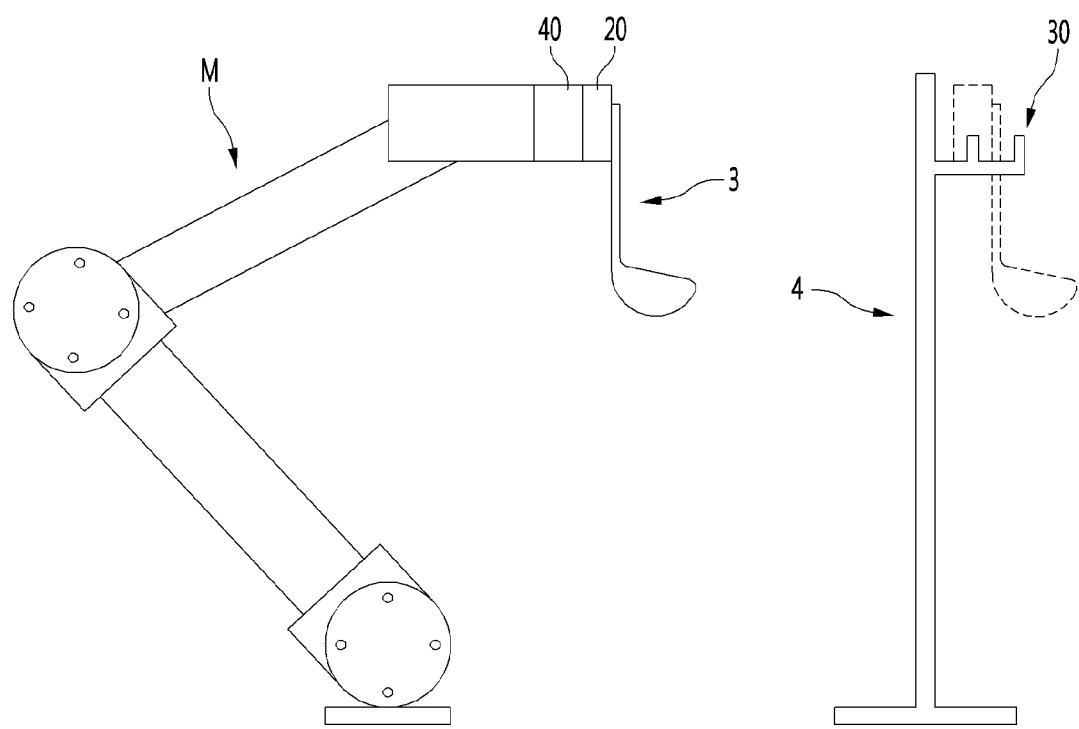
FIG. 4 is a schematic diagram of a tool change system according to an embodiment of the present disclosure.
Figure 5:
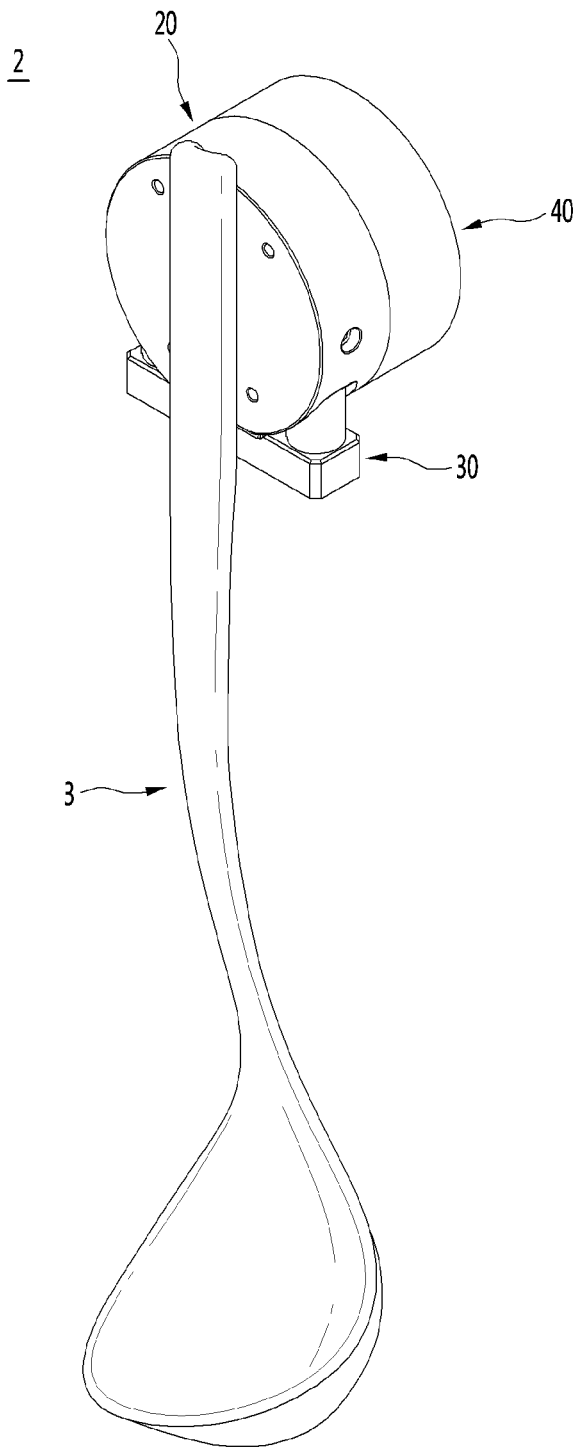
FIG. 5 is a perspective view illustrating a state that a tool is provided in the tool change system according to an embodiment of the present disclosure.

FIG. 4 is a schematic diagram of a tool change system according to an embodiment of the present disclosure, and FIG. 5 is a perspective view illustrating a state that a tool is provided in a tool change system according to an embodiment of the present disclosure.

The tool change system 2 according to an embodiment of the present disclosure comprises a tool coupler 20, a tool mounter 30 and a tool changer 40. The tool change system 2 may further comprise a manipulator (M).

Hereinafter, for convenience of explanation, the tool coupler 20 is named "a coupler", a tool mounter 30 is named "a mounter", and a tool changer 40 is named "a changer".

The coupler 20 is fastened to a tool 3. The coupler 20 may be provided separately from the tool 3. Therefore, the coupler 20 may be used by complying with different types of tools 3. The tool 3 may be a tool required in task performance of the manipulator (M). The tool 3 may be a tool required in a performance task of the manipulator (M). For example, the tool 3 may any one of a spoon, a ladle and a spatula.

The coupler 20 is configured to be selectively coupled to the changer 40. In addition, the coupler 20 is configured to be provided in the mounter 30 or be separable from the mounter 30. The couple 20 may be provided in or separated from an upper side of the mounter 30.

The changer 40 may be provided in the manipulator (M). In more detail, the changer 40 may be provided in an end of the manipulator (M). The manipulator (M) may be a constituent included in the robot 100a described above.

The changer 40 may be selectively fastened to the coupler 20. The changer 40 may allow the tool 3 and the coupler 20 to be separated from the mounter 30, or allow the tool 3 and the coupler 20 to be mounted in the mounter 30.

The mounter 30 is configured such that the coupler 20 is mounted. As the coupler 20 fastened to the tool 3 is mounted in the mounter 30, the tool 3 may be placed in the mounter 30. In addition, the mounter 30 may be fixed to a structure 4. As an example, the structure 4 may include a wall, a bracket, a self and so forth.

A plurality of mounters 30 may be provided. Tools 3 that are identical to each other or have different types may be mounted in each of the mounters 30.

The manipulator (M) may fasten the coupler 20 fastened in the tool 3 suitable for a task with the changer 40, and the tool 3 and the coupler 20 may be separated from the mounter 30. Hereinafter, the manipulator (M) may perform the task by using the tool 3 in a state that the tool 3 and the coupler 20 are fastened in the changer 40. When the task is completed, the manipulator (M) may mount the tool 3 and the coupler 20 in the mounter 30.

Figure 6:
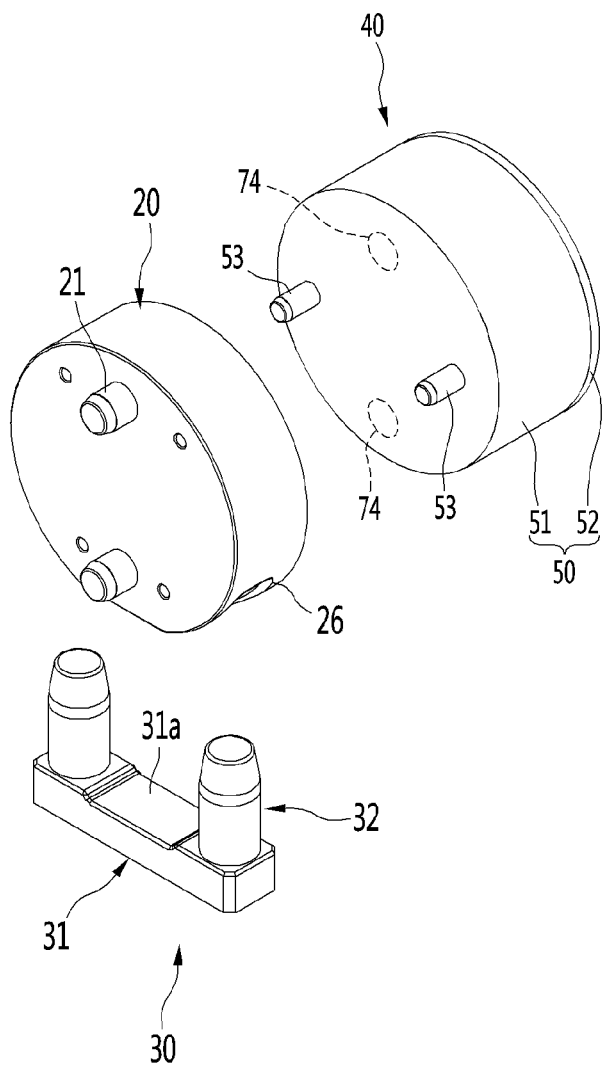
FIG. 6 is an exploded perspective view of the tool change system illustrated in FIG. 5.
Figure 7:
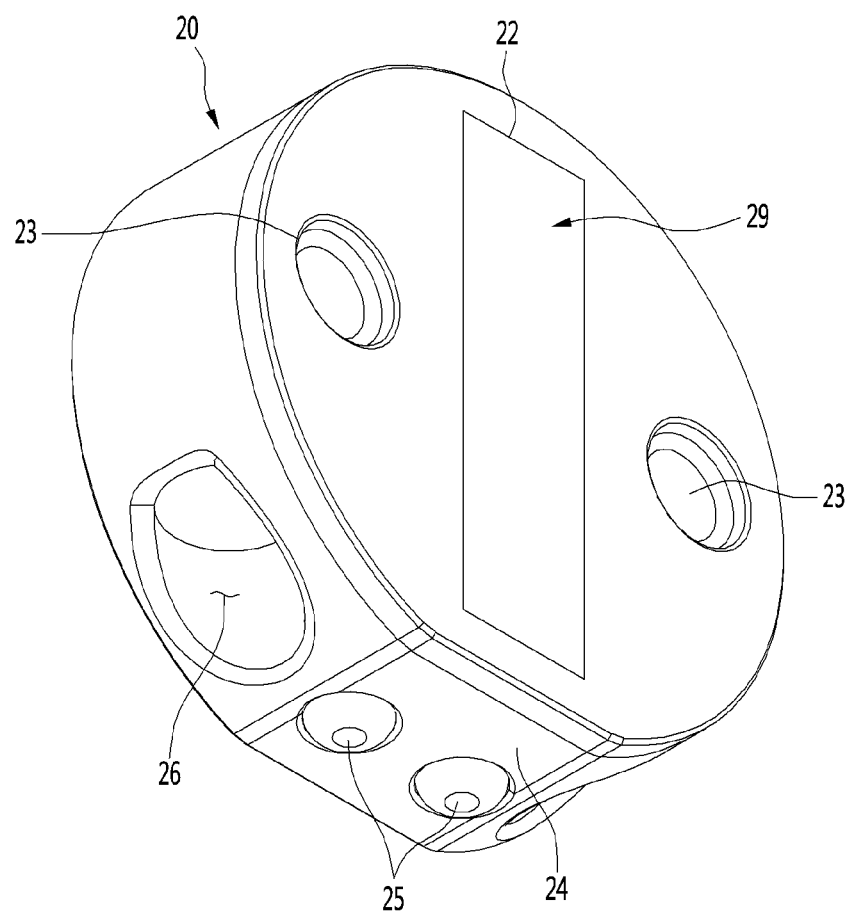
FIG. 7 is a perspective view of a tool coupler seen from a different direction according to an embodiment of the present disclosure.

FIG. 6 is an exploded perspective view of the tool change system illustrated in FIG. 5, and FIG. 7 is a perspective view of a tool coupler seen from a different direction according to an embodiment of the present disclosure.

As described above, the tool change system 2 may include the coupler 20, the mounter 30 and the changer 40.

The coupler 20 may be a non-magnetic material. The coupler 20 may be approximately a cylindrical shape, but the present disclosure is not limited thereto. The coupler 20 may include one surface, the other surface facing the one surface, and a circumferential surface that connects the one surface and the other surface. Hereinafter, a case will be described by way of example in which the one surface of the coupler 20 is a front surface and the other surface is a back surface.

A fastening portion 21 configured to be fastened with the tool 3 (see FIG. 5) may be provided in the coupler 20. In more detail, the front surface of the coupler 20 may face the tool 3, and the fastening portion 21 may be provided in the front of the coupler 20.

A fastening portion 33 may protrude to the front. A plurality of fastening portions 33 are preferably provided for strongly fastening the tool 3 and the coupler 20. As an example, the couplers 33 may be provided in pairs spaced apart up and down.

A magnetic body 29 may be provided in the coupler 20. In more detail, the magnetic body 29 may be provided in the back surface of the coupler 20. In more detail, a mounting groove 22 recessed in the front may be formed in the back surface of the coupler 20, and the magnetic body 29 may be inserted into the recessed groove 22. It is preferable to continuously connect a back surface of the magnetic body 29 and the back surface of the coupler 20 without being not stepped.

The magnetic body 29 may be elongated in one direction. For example, the magnetic body 29 be vertically elongated. A pair of terminals 74 of the changer 40 that will be described below may apply a magnetic force to the magnetic body 29. To that end, the coupler 20 and the changer 40 may be fastened to each other.

A mounting groove 26 into which a mounting pin 32 of the mounter 30 that will be described below is inserted may be formed in the coupler 20. A mounting groove 24 may be formed in pairs spaced apart right and left. The mounting groove 26 may be formed on a circumferential surface of the coupler 20. The mounting groove 26 may be recessed to an upper side of the circumferential surface of the coupler 20 and be open to a lower part.

An inserting groove 23 into which a support pin 53 of the changer 40 that will be described below is inserted may be formed in the coupler 20. The inserting groove 23 may be formed in the back surface of the coupler 20. The inserting groove 23 may be recessed from the back surface to a front part of the coupler 20.

A plurality of support pins 53 and a plurality of inserting grooves 23 is preferably provided to reliably support the coupler 20 in a vertical direction. Some of the plurality of inserting grooves may be disposed in one side of the magnetic body 29, and some other inserting grooves may be disposed in the other side of the magnetic body 29. As an example, the inserting grooves 23 may be provided in pairs, and one inserting groove 23 may be disposed in a left side of the magnetic body 29, and the other inserting groove 23 may be disposed in a right side of the magnetic body 29.

As the inserting groove 23 goes to an inner side, the inserting groove 23 may be tapered in a direction that an internal diameter become smaller. Therefore, the support pin 53 may be easily inserted into the inserting groove 23.

At least one cushion 25 may be included in the coupler 20. The cushion 25 may include an elastic deformation material such as rubber, urethane and the like.

In more detail, the cushion 25 may be provided in a bottom surface 24 of the coupler 20. The bottom surface 24 of the coupler 20 may be included in the circumferential surface of the coupler 20, and may be a horizontal plane. The bottom surface 24 and the cushion 25 of the coupler 20 may be disposed between a pair of mounting grooves 26 relative to a circumferential direction of the coupler 20.

The cushion 25 may protrude more to a lower side than the bottom surface 24 of the coupler 20. In the process of mounting the coupler 20 in the mounter 30, the cushion 25 may minimize an impact applied to the coupler 20 and the mounter 30.

The bottom surface 24 and the cushion 25 of the coupler 20 may face an upper surface of a fixing bar 31 of the mounter 30. In more detail, a stepped part 31a facing the bottom surface 24 and the cushion 25 of the coupler 20 may be formed on the upper surface of the fixing bar 31. The stepped part 31a may be stepped downwards relative to the upper surface of the fixing bar 31. The stepped part 31a may be disposed between a pair of mounting pins 32. When the coupler 20 is mounted in the mounter 30, the cushion 25 may touch the stepped part 31a.

As the coupler 20 and the fixing bar 31 do not interfere with each other through the stepped part 31, the mounting pin 32 may be deeply inserted into the mounting groove 26. To that end, the coupler 20 may be stably mounted in the mounter 30.

Meanwhile, the changer 40 may be disposed in a back part of the coupler 20. The changer 40 may be fastened or separated in the back part of the coupler 20.

The changer 40 may include A housing 50. The housing 50 may be fastened in the manipulator (M) (see FIG. 4). The housing 50 may be a non-magnetic material. Therefore, the housing 50 may not affect a magnetic field created by a magnet 60 that will be described below.

The housing 50 may form an appearance of the changer 40. The housing 50 may be a cylindrical shape, but the present disclosure is not limited thereto. The housing 50 may include one surface, the other surface spaced apart from the one surface, and a circumferential surface that connects the one surface and the other surface. Hereinafter, a case will be described by way of example in which the one surface of the housing 50 is a front surface and the other surface thereof is a back surface.

In more detail, the housing 50 may include a housing body 51 having an inner space formed therein, and a housing cover 52 covering the inner space.

The housing body 51 may include the front surface and the circumferential surface of the housing 50, and the housing cover 52 may include the back surface of the housing 50. That is, a front surface and a circumferential surface of the housing body 51 may mean the front surface and the circumferential surface of the housing 50, and a back surface of the housing cover 52 may mean the back surface of the housing 50.

The support pin 53 configured to support the coupler 20 may be provided in the changer 40. In more detail, the front surface of the housing 50 may face the coupler 20, and the support pin 53 may be provided in the housing 50, and more particularly, provided in the front surface of the housing body 51. The support pin 53 is preferably a non-magnetic material.

The support pin 53 may be elongated toward the coupler 20. The support pin 53 may protrude to the front.

The support pin 53 may be inserted into the inserting groove 23 of the coupler 20. Therefore, the support 53 may support the coupler 20 relative to the vertical direction, and may prevent the coupler 20 from being dropping by gravity. A plurality of support pins 53 are preferably provided to stably support the coupler 20. As an example, the support pins 53 may be formed in pairs spaced apart right and left.

Figure 8:
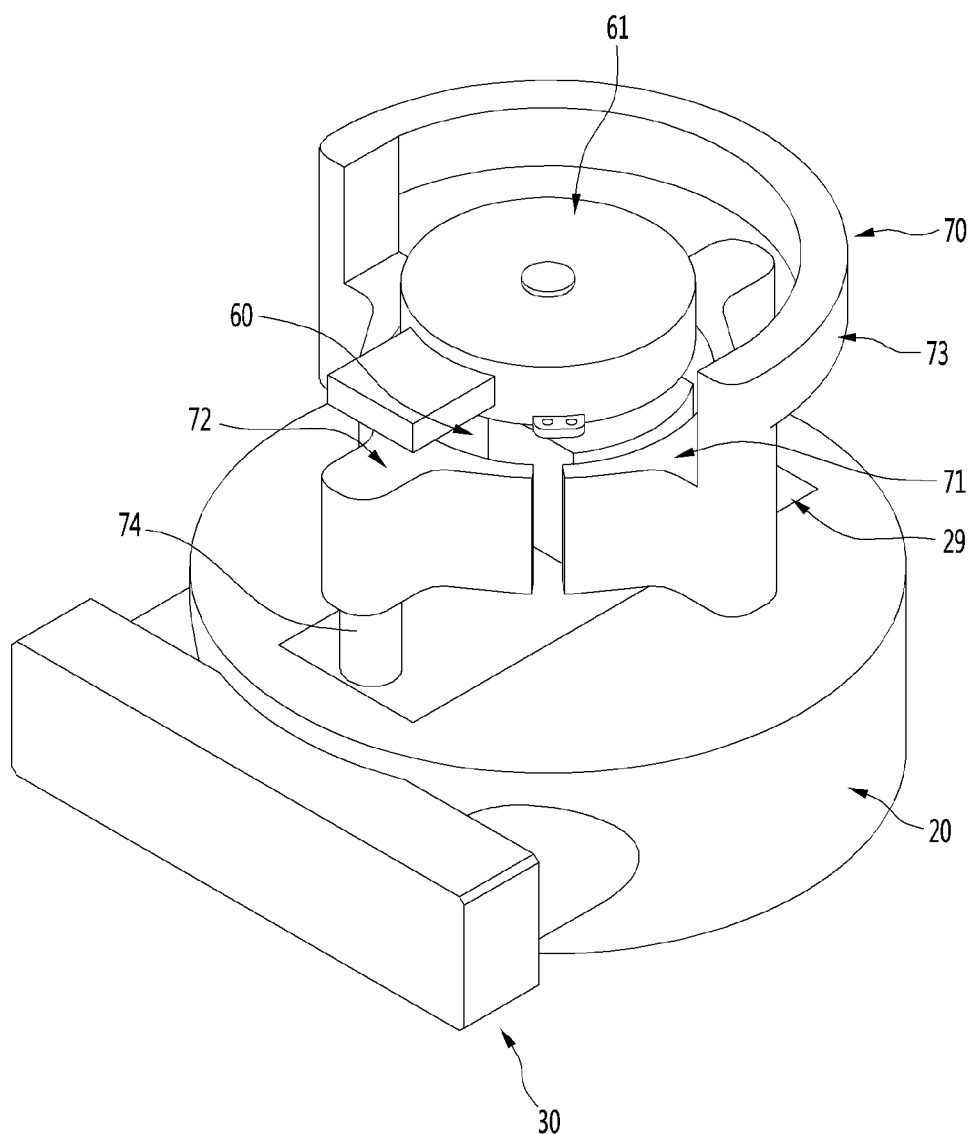
FIG. 8 is a view that a housing of the tool changer is removed from the tool change system according to an embodiment of the present disclosure.
Figure 9:
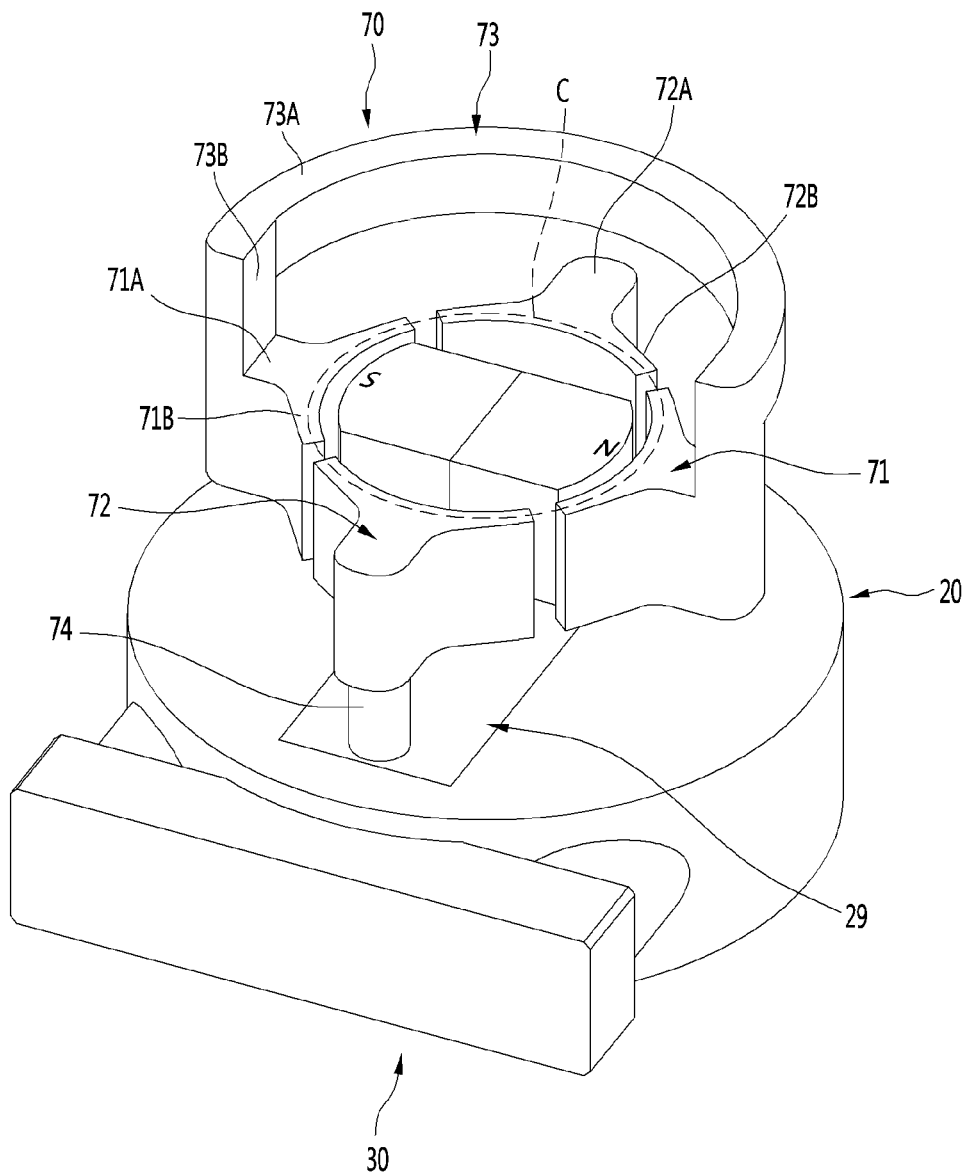
FIG. 9 is a view that a motor is removed from the tool change system illustrated in FIG. 7.
Figure 10:
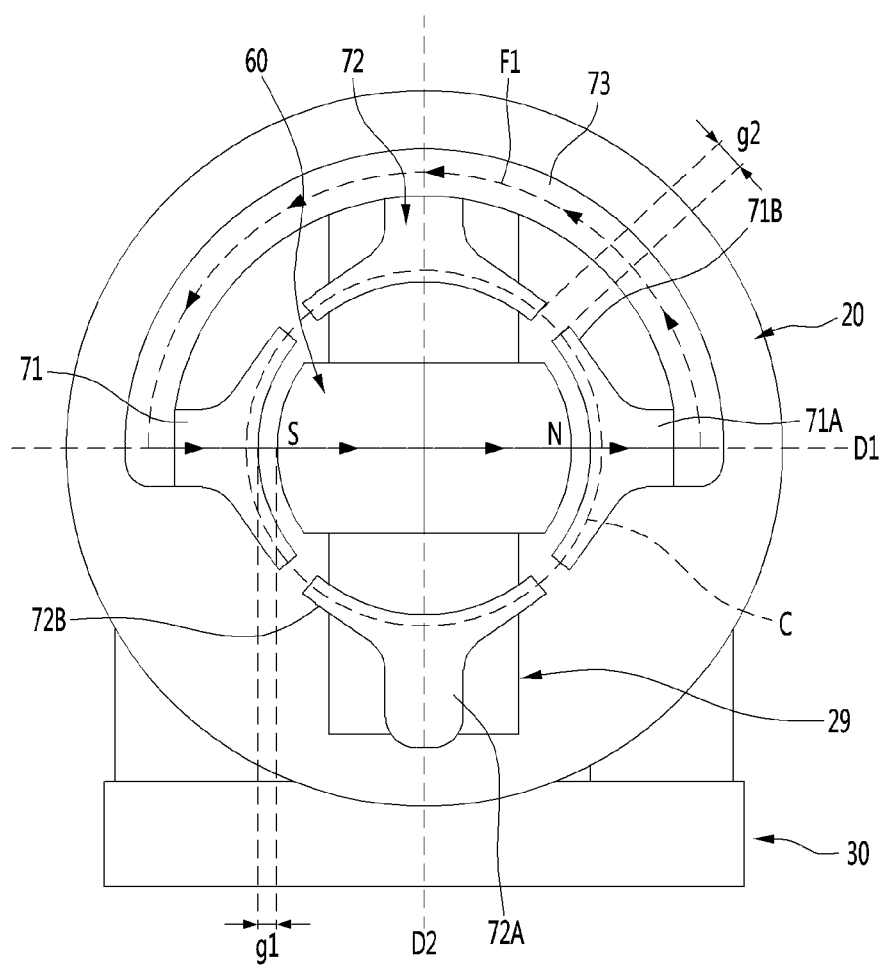
FIG. 10 is a view illustrating a state that a magnet of the tool changer is elongated in a first direction according to an embodiment of the present disclosure.
Figure 11:
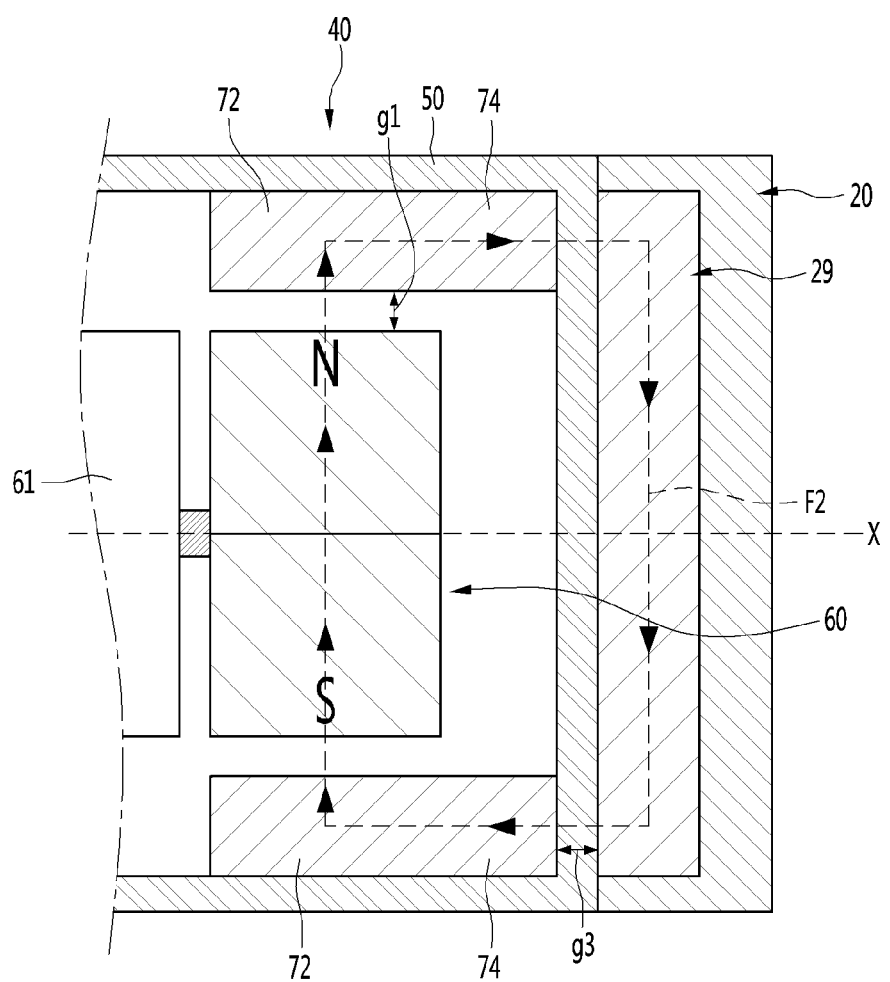
FIG. 11 is a view for explaining that when the magnet is elongated in a second direction, a magnetic force of the magnet is applied to the tool coupler according to an embodiment of the present disclosure.

FIG. 8 is a view that a housing of the tool changer is removed from the tool change system according to an embodiment of the present disclosure, FIG. 9 is a view that a motor is removed from the tool change system illustrated in FIG. 7, FIG. 10 is a view illustrating a state that a magnet of the tool changer is elongated in a first direction according to an embodiment of the present disclosure, and FIG. 11 is a view for explaining that when the magnet is elongated in a second direction, a magnetic force of the magnet is applied to the tool coupler according to an embodiment of the present disclosure.

The changer 40 may include the magnet 60, a motor 61 and a core 70.

The magnet 60 may be embedded in the housing 50 (see FIG. 6). The magnet 60 may be a bar shape. The magnet 60 is preferably a permanent magnet.

The motor 61 may be embedded in the housing 50. The motor 61 may be connected to magnet 60. In more detail, the motor may be connected to a center part of the magnet 60. The motor 61 may be disposed in a back part of the magnet 60.

The motor 61 may rotate the magnet 60. The motor 61 may rotate the magnet 60 centered on a rotation axis (X) perpendicular to a longitudinal direction of the magnet 60. As an example, the rotation axis (X) may be elongated in an anteroposterior direction of the rotation axis (X).

The core 70 may derive a route of a magnetic flux by the magnet 60. The core 70 may be a magnetic material. At least part of the core 70 may be disposed in the housing 50.

In more detail, the core 70 may include a pair of first poles 71, a pair of second poles 72 and the pair of terminals 74.

The first poles 71 and the second poles 72 may be alternately disposed on an imaginary circle. The imaginary circle (C) may have the rotation axis (X) of the magnet 60 as a center.

The magnet 60 may be disposed in the imaginary circle (C). That is, a diameter of the imaginary circle (C) may be more than a length of the magnet 60.

Both poles of the magnet 60 may face the pair of first poles 71 and the pair of second poles 72. In more detail, when the magnet 60 rotates to be elongated in a first direction (D1), the both poles of the magnet 60 may face the pair of first poles 71. When the magnet 60 rotates to be elongated in a second direction (D2), the both poles of the magnet 60 may face the pair of second poles 72 perpendicular to the first direction (D1). The second direction (D2) may be aligned with a longitudinal direction of the magnetic body 29 of the coupler 20. As an example, the first direction may be a horizontal direction, and the second direction may be a vertical direction.

The pair of poles 71 and the pair of poles 72 may be spaced apart from the both poles of the magnet 60. In more detail, when the magnet 60 rotate to be elongated in the first direction (D1), a gap may be formed between the both poles of the magnet 60 and the pair of first poles 71. When the magnet 60 rotate to be elongated in the second direction (D2), a gap may be formed between the both poles of the magnet 60 and the pair of second poles 72.

Inner surfaces of the pair of first poles 71 and the pair of second poles 72 may be concavely formed. In addition, the both ends of the magnet 60 may be concavely formed.

In more detail, when the magnet 60 rotate to be elongated in the first direction (D1), a gap (g1) between the both poles of the magnet 60 and the pair of first poles 71 may be constant relative to the circumferential direction. When the magnet 60 rotate to be elongated in the second direction (D2), a gap (g1) between the both poles of the magnet 60 and the pair of second poles 72 may be constant relative to the circumferential direction.

The pair of first poles 71 may include a first pole body 71A and a pair of first pole shoes 71B.

The first pole body 71A may be connected to a bridge 73. The first pole body 71A may be elongated in a radial direction of an imaginary circle (C). The bridge 73 may be connected to an outer end of the first pole body 71A.

The pair of first pole shoes 71B may protrude from an inner end to both sides of the first pole body 71A. The pair of first pole shoes 71B may be elongated in the radial direction of the imaginary circle (C). An inner surface of the first pole body 71A and inner surfaces of the pair of first pole shoes 71B may be continuously connected without being not stepped.

The pair of the second poles 72 may include a second pole body 72A and a pair of second pole shoes 72B.

The second pole body 72A may be connected to the pair of the terminals 74. The second pole body 72A may be elongated in the radial direction of the imaginary circle (C). The pair of terminals 74 may be connected to an outer end of the second pole body 72A.

The pair of second pole shoes 72B may protrude from an inner end to both sides of the second pole body 72A. The pair of second pole shoes 72B may be elongated in the radial direction of the imaginary circle (C). An inner surface of the second pole body 72A and inner surfaces of the pair of second pole shoes 72B may be continuously connected without being not stepped.

The pair of first pole shoes 71B and the pair of second pole shoes 72B may be spaced apart from each other. That is, a gap may be formed between the pair of first pole shoes 71B and the pair of second pole shoes 72B.

The gap (G2) between the pair of first pole shoes 71B and the pair of second pole shoes 72B may be greater than a gap (g1) between the pair of first poles 71 or the pair of second poles 72 and the both ends of the magnet 60. The gap (G2) between the pair of first pole shoes 71B and the pair of second pole shoes 72B may mean the shortest distance between the pair of first pole shoes 71B and the pair of second pole shoes 72B.

Meanwhile, the bridge 73 may be connected to the pair of first poles 71. In more detail, one end of the bridge 73 may be connected to one of the pair of first poles 71, and the other end of the bridge 73 may be connected to the other of the pair of first poles 71.

The bridge 73 may be connected to a back part of the pair of first poles 71.

In more detail, the bridge 73 may include a bridge body 73A, and a connection unit 73B formed in both ends of the bridge body 73A and connected to the pair of first poles 71.

The bridge body 73A may form an arc shape. In more detail, the bridge body 73A may form an arc shape centered on the rotation axis (X). The bridge body 73A may be spaced apart from a circumference of the motor 61, and may surround the circumference of the motor 61. That is, an inner surface of the bridge body 73A may face the circumference of the motor 61. By such an arrangement, the changer 40 may be a compact.

The connection unit 73B may be formed in both ends of the bridge body 73A. The connection unit 73B may protrude from both ends of the bridge body 73A to the front. The connection unit 73B may be connected to the back part of the pair of first poles 71. In more detail, the connection unit 73B may be connected to a back part of the outer end of the first pole body 71A.

The pair of the terminals 74 may be connected to the pair of second poles 72. The pair of terminals 74 may protrude from the pair of second poles 72 to the front. In more detail, the pair of terminals 74 may protrude from the outer end of the second pole body 72A to the front.

The pair of terminals 74 may face the magnetic body 29 of the coupler 20. The pair of terminals 74 and the magnetic body 29 may overlap with each other in an axial direction (for example, an anteroposterior direction) of the changer 40. A magnetic force may be selectively applied between the pair of the terminals 74 and the magnetic body 29, and the coupler 20 and the changer 40 may be fastened by the magnetic force.

The pair of terminals 74 may disposed in the housing 50 (see FIG. 6). The gap (G2) between the pair of first pole shoes 71B and the pair of second pole shoes 72B may be greater than the gap (g3) between the pair of terminals 74 and the magnetic body 29.

In more detail, the gap (g2) between the pair of first pole shoes 71B and the pair of second pole shoes 72B may be greater than a sum of a gap (g3) between the pair of terminals 74 and the magnetic body 29 and a gap (g1) between the pair of first poles 71 or the pair of second poles 72 and the both poles of the magnet 60. The pair of first poles 71 and the pair of second poles 72 may be separated from each other without affecting magnetic fluxes therebetween.

Meanwhile, a tube passing hole (not shown) may be formed in the housing 50, and the pair of terminals 74 can be in contact with the magnetic body 29 by passing through the tube passing hole. In this case, the gap (g3) between the pair of terminals 74 and the magnetic body 29 may be 0.

Hereinafter, an operation that the changer 40 is fastened to or separated from the coupler 20 will be described.

The changer 40 may be selectively fastened to or separated from the coupler 20. The changer 40 may be fastened to the coupler 20 in the back part of the coupler 20.

As shown in FIG. 10, when the both poles of the magnet 60 face the pair of poles 71, the magnet 60, the pair of first poles 71, the bridge 73, and the magnetic body 29 may form a first magnetic flux loop (F1) together. The first magnetic flux loop (F1) may mean a route of a magnetic flux configured in that a magnetic flux created by the magnet 60 is derived by the pair of first poles 71 and the bridge 73. The first magnetic flux loop (F1) may be a closed loop.

The first magnetic flux loop (F1) may pass from one pole (N pole) of the magnet 60 to one of the pair of first poles 71, the bridge 73 and the other of the pair of first poles 71 in order, thus leading to an opposite pole (S pole) of the magnet 60.

To that end, the magnetic flux of the magnet 60 may not be derived to a side of the terminal 74. Therefore, the changer 40 and the coupler 20 may be easily separated from each other without applying the magnetic force (gravity) between the terminal 74 and the magnetic body 29.

On the other hand, as shown in FIG. 11, when the poles of the magnet 60 face the pair of second poles 72, the magnet 60, the pair of second poles 72, the pair of terminals 74, and the magnetic body 29 may form a second magnetic flux loop (F2) together. The second magnetic flux loop (F2) may mean a route of a magnetic flux configured in that the magnetic flux created by the magnet 60 is derived by the pair of second poles 71, the terminal 74 and the magnetic body 29. The second magnetic flux loop (F2) may be a closed loop.

The second magnetic flux loop (F2) may pass from one pole (N pole) of the magnet 60 to one of the pair of second poles 72, one of the pair of terminals 74, the magnetic body 29, the other of the pair of terminals 74 and the other of the pair of second poles 72 in order, thus leading to an opposite pole (S pole) of the magnet 60.

To that end, the magnetic force (gravity) may be applied between the pair of terminals 74 and the magnetic body 29, thereby maintaining the fastening of the changer 40 and the coupler 20. The magnetic force may be applied as a binding power for an axial direction (for example, an anteroposterior direction) of the changer 40.

In conclusion, the magnetic force applied between the coupler 20 and the changer 40 may be easily controlled by rotating the magnet 60.

In addition, when the changer 40 is coupled to the coupler 20, the support pin 53 (see FIG. 6) of the changer 40 may be inserted into the inserting groove (23) (see FIG. 7) of the coupler 20. The support pin 53 may support the coupler 20 for the radial direction (for example, a vertical direction) of the changer 40.

Figure 12:
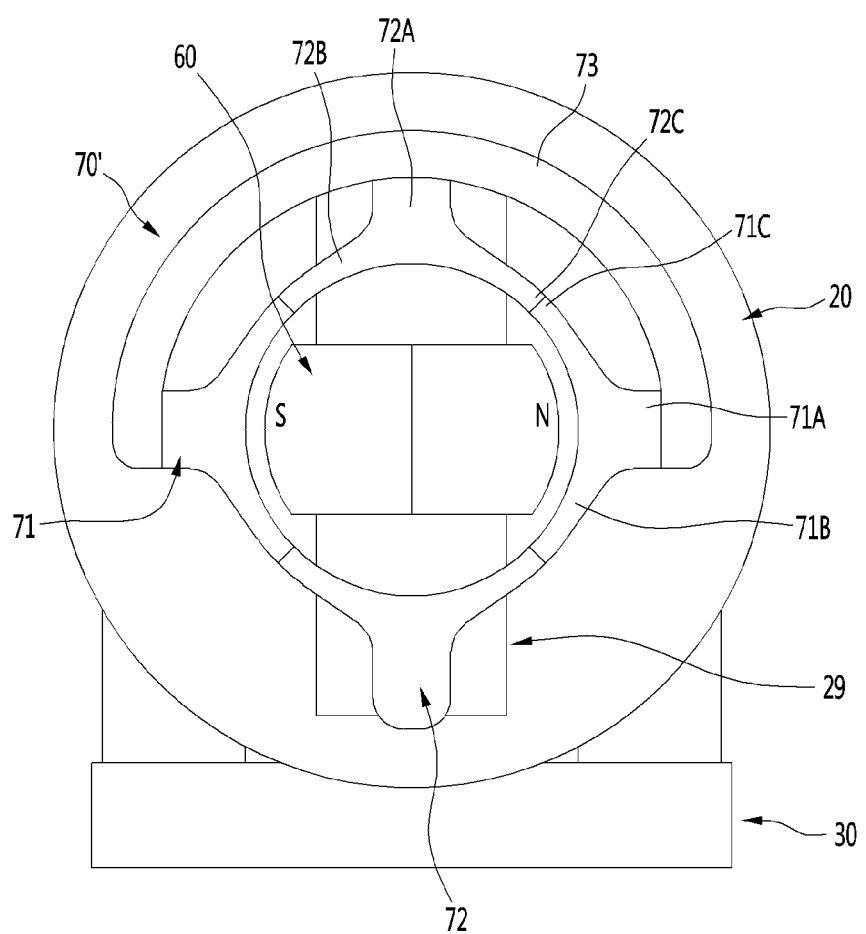
FIG. 12 is a view for explaining an inner part of the tool changer according to another embodiment of the present disclosure.
Figure 13:
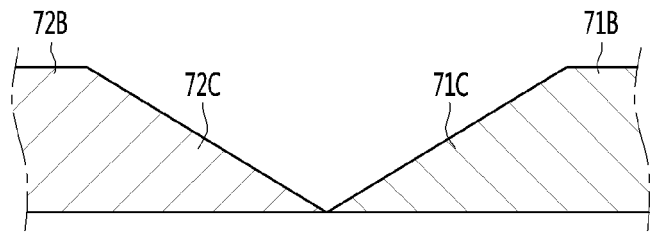
FIG. 13 is cross-sectional views of a first pole and a second pole illustrated in FIG. 12.

FIG. 12 is a view for explaining an inner part of the tool changer according to another embodiment of the present disclosure, and FIG. 13 is cross-sectional views of a first pole and a second pole illustrated in FIG. 12.

Hereinafter, the descriptions overlapping with one embodiment described above will be omitted and the differences therefrom will be described.

The first pole shoe 71B and the second pole shoe 72B of a core 70' according to this embodiment may be directly connected to each other. The first pole shoe 71B and the second pole shoe 72B may be in line contact with each other.

As cross-section areas of the first pole shoe 71B and the second pole shoe 72B get closer to each other, the cross-section areas may get narrow.

In more detail, the first pole shoe 71B may include a first slope portion 71C, and the second pole shoe 72B may include a second slope portion 72C. The first slope portion 71C may be disposed in an end of the first pole shoe 71B, and the second slope portion 72C may be disposed in an end of the second pole shoe 72B.

As the first slope portion 71C and the second slope portion 72C get closer to each other, they may be slopingly formed in a direction that the cross-section areas become smaller. The first slope portion 71C and the second slope portion 72C may be in line contact with each other.

Therefore, the pair of first poles 71 and the pair of second poles 72 may be separated from each other without affecting magnetic fluxes therebetween.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

Since a tool change system according to a preferred embodiment of the present disclosure fastens/separates a tool by a magnetic force, the tool change system needs no separate external system. To that end, the tool change system has the advantage of a compact size.

In addition, a magnetic force between a tool changer and a tool coupler may be controlled by rotation of a magnet. To that end, the tool changer and the tool coupler may be easily fastened or separated.

In addition, since the tool changer and the tool coupler are mutually fastened or mounted to each other by the magnetic force therebetween, the tool change system has the advantage of improving operation reliability.

In addition, cogging torque created upon rotating the magnet may be minimized by a first pole shoe and a second pole shoe.

In addition, as the first pole shoe and the second pole shoe are spaced apart from each other and are in line contact with each other, a pair of first poles and a pair of second poles may be separated from each other without affecting magnetic fluxes therebetween.

What is claimed is:

1. A tool changer comprising:
a housing fastened to a manipulator of a robot, wherein the housing is a non-magnetic material;
a bar-shaped magnet disposed in the housing;
a motor configured to rotate the magnet on a rotation shaft perpendicular to a longitudinal direction of the magnet; and
a core configured to derive a path of a magnetic flux by the magnet;
wherein the core comprises:
a pair of first poles facing both poles of the magnet, when the magnet rotates to be elongated in a first direction,
a bridge configured to connect the pair of the first poles and disposed in the housing, wherein the bridge is a magnetic material;
a pair of second poles facing the both poles of the magnet, when the magnet rotates to be elongated in a second direction perpendicular to the first direction; and
a pair of terminals connected to the second poles and facing a magnetic body disposed outside the housing.

2. The tool changer according to claim 1,
wherein the pair of first poles and the pair of second poles are spaced apart from the both poles of the magnet.

3. The tool changer according to claim 1,
wherein inner surfaces of the pair of first poles and the pair of second poles are concavely formed, and
wherein the both ends of the magnet are convexly formed.

4. The tool changer according to claim 1,
wherein the pair of first poles and the pair of second poles are alternately disposed relative to a circumferential direction of an imaginary circle centered on the rotation shaft of the magnet.

5. The tool changer according to claim 4,
wherein the first pole comprises:
a first pole body connected to the bridge; and
a first pole shoe protruding from the both sides of the first pole body to the circumferential direction of the imaginary circle, and
wherein the second pole comprises:
a second pole body connected to the terminal; and
a second pole shoe protruding from both sides of the second pole body to the circumferential direction of the imaginary circle.

6. The tool changer according to claim 5,
wherein the pair of first poles and the pair of second poles are spaced apart from the both poles of the magnet; and
wherein the first pole shoe and the second pole shoe are spaced from each other.

7. The tool changer according to claim 6,
wherein a gap between the first pole shoe and the second pole shoe are greater than a gap between the pair of first poles or the pair of second poles and the both poles of the magnet.

8. The tool changer according to claim 5,
wherein the first pole shoe and the second pole shoe are in line contact with each other; and
wherein a cross-section area of the first pole shoe gets narrow as the cross-section area gets closer to the second pole shoe, and a cross-section area of the second pole shoe gets narrow as the cross-section area gets closer to the first pole shoe.

9. A tool change system comprising:
a tool coupler having a magnetic body and fastened to a tool;
a tool changer provided in a manipulator of a robot and selectively fastened to the tool coupler,
wherein the tool changer comprises:
 a bar-shaped magnet;
 a motor configured to rotate the magnet on a rotation shaft perpendicular to a longitudinal direction of the magnet; and
 a pair of first poles facing both poles of the magnet, when the magnet rotates at a first angle,
 a bridge configured to connect the first poles, wherein the bridge is a magnetic material;
 a pair of second poles facing the both poles of the magnet, when the magnet rotates at a second angle different from the first angle; and
 a pair of terminals connected to the second poles and facing the magnetic body.

10. The tool change system according to claim 9, wherein the pair of terminals are spaced apart from the magnetic body.

11. The tool change system according to claim 9, wherein the pair of first poles and the pair of second poles are spaced apart from the both poles of the magnet.

12. The tool change system according to claim 9,
wherein inner surfaces of the pair of first poles and the pair of second poles are concavely formed, and
wherein both ends of the magnet are convexly formed.

13. The tool change system according to claim 9,
wherein the pair of first poles and the pair of second poles are alternately disposed on an imaginary circle centered on the rotation shaft of the magnet.

14. The tool change system according to claim 13,
wherein the first pole comprises:
 a first pole body connected to the bridge; and
 a first pole shoe protruding from both sides of the first pole body to the circumferential direction of the imaginary circle; and
wherein the second pole comprises:
 a second pole body connected to the terminal; and
 a second pole shoe protruding from both sides of the second pole body to the circumferential direction of the imaginary circle.

15. The tool change system according to claim 14,
wherein the pair of first poles and the pair of second poles are spaced apart from the both poles of the magnet,
the pair of terminals is spaced from the magnet body, and
the first pole shoe and the second pole shoe are spaced apart from each other.

16. The tool change system according to claim 15, wherein a gap between the first pole shoe and the second pole shoe is greater than a gap between the pair of first poles or the pair of second poles and the both poles of the magnet.

17. The tool change system according to claim 15, wherein a gap between the first pole shoe and the second pole shoe is greater than a gap between the pair of terminals and the magnetic body.

18. The tool change system according to claim 15, wherein a gap between the first pole shoe and the second pole shoe is greater than a sum of a gap between the pair of terminals and the magnetic body and a gap between the pair of first poles or the pair of second poles and the both poles of the magnet.

19. The tool change system according to claim 14, wherein the first pole shoe and the second pole shoe are in direct contact with each other, and
a cross-section area of the first pole shoe gets narrow as the cross-section area gets closer to the second pole shoe, and a cross-section area of the second pole shoe gets narrow as the cross-section area gets closer to the first pole shoe.

20. The tool change system according to claim 9, wherein the tool changer further comprises a housing configured to accommodate the magnet, the motor, the first pole, the bridge and the second pole, and mounted in the manipulator.

* * * * *